(12) United States Patent
Wagner (10) Patent No.: US 11,176,434 B2
(45) Date of Patent: Nov. 16, 2021

(54) ENCRYPTED PRINTING

(71) Applicant: Hewlett-Packard Development Company, L.P., Spring, TX (US)

(72) Inventor: Bill Wagner, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 26 days.

(21) Appl. No.: 16/614,085

(22) PCT Filed: Jul. 17, 2017

(86) PCT No.: PCT/US2017/042377
§ 371 (c)(1),
(2) Date: Nov. 15, 2019

(87) PCT Pub. No.: WO2019/017876
PCT Pub. Date: Jan. 24, 2019

(65) Prior Publication Data
US 2021/0158113 A1 May 27, 2021

(51) Int. Cl.
| G06K 15/00 | (2006.01) |
| G06F 11/10 | (2006.01) |
| G06F 21/60 | (2013.01) |
| G06K 15/02 | (2006.01) |
| H04L 9/06 | (2006.01) |
| H04L 9/08 | (2006.01) |

(52) U.S. Cl.
CPC ...... *G06K 15/4095* (2013.01); *G06F 11/1016* (2013.01); *G06F 21/602* (2013.01); *G06F 21/608* (2013.01); *G06K 15/1817* (2013.01); *H04L 9/0643* (2013.01); *H04L 9/0861* (2013.01)

(58) Field of Classification Search
None
See application file for complete search history.

(56) References Cited

U.S. PATENT DOCUMENTS

| 7,532,367 B2 * | 5/2009 | Morita .............. H04N 1/00352 358/400 |
| 7,731,435 B2 | 6/2010 | Piersol et al. |
| 8,494,162 B2 | 7/2013 | Young et al. |
| 8,526,063 B2 | 9/2013 | Lee et al. |

(Continued)

FOREIGN PATENT DOCUMENTS

| WO | WO-2002039411 | 5/2002 |
| WO | WO-2013062531 | 5/2013 |

OTHER PUBLICATIONS

Samsung Multifunction Printer Security, pp. 1-48, Mar. 28, 2011.

*Primary Examiner* — Dung D Tran
(74) *Attorney, Agent, or Firm* — Mannava & Kang (57) ABSTRACT

A printing apparatus can print an encrypted document. The printing apparatus includes a scanner to scan a print medium, an analog-to-digital converter coupled to the scanner to convert analog scan data digital scan data, a hardware pixelization circuit to generate a sequence of pixels from the digital scan data, an encryptor to encrypt the sequence of pixels to generate a sequence of encrypted pixels prior to storing of the digital scan data, a data storage device to temporarily store the sequence of the encrypted pixels, and a printing subsystem to print the stored sequence of the encrypted pixels.

14 Claims, 6 Drawing Sheets

(56) References Cited

U.S. PATENT DOCUMENTS

| | | | | |
|---|---|---|---|---|
| 8,571,212 B2* | 10/2013 | Anan | ............... | G09C 5/00 |
| | | | | 380/54 |
| 2005/0210259 A1* | 9/2005 | Richardson | ............ | H04L 63/06 |
| | | | | 713/179 |
| 2009/0220076 A1* | 9/2009 | Kuraki | ................... | H04N 1/44 |
| | | | | 380/54 |
| 2009/0245511 A1* | 10/2009 | Nakagata | ............... | H04N 1/44 |
| | | | | 380/54 |
| 2010/0074443 A1* | 3/2010 | Ishii | ................. | H04N 1/32144 |
| | | | | 380/243 |
| 2011/0004607 A1 | 1/2011 | Lokam et al. | | |
| 2011/0280395 A1* | 11/2011 | Nakagata | ............... | G09C 1/04 |
| | | | | 380/28 |

\* cited by examiner

ENCRYPTED PRINTING

BACKGROUND

Users need to store private data, such as social security numbers, tax returns, credit card data and so on. It is very convenient to store this data on one's personal computer (PC), smart phone or other such device. Unfortunately, all of these devices run external code and are at risk of infection by a wide variety of computer viruses. These viruses put user data at risk even if the data is encrypted. When documents are kept on PCs or smartphones, they can be stolen by intruders such as rootkit applications. Even when encrypted digital documents are stored, the PCs or smartphones can be hacked by people and possibly decrypted.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an example of the present disclosure, encrypted printing is used to produce encrypted hard copies of documents. The encrypted printing is a printing feature providing for a document to be printed in an encrypted form as a plurality of dots, symbols, bar codes, etc. The encrypted form may be a form that is non-readable by a human, but a machine may be able to read the encrypted content and decrypt the content with a decryption function. According to an example of the present disclosure, a system may include a multi-purpose printer having printing and scanning subsystems. The system may scan a hard copy document and print it in an encrypted form for safe storage. In one example, the system may include an interface that allows a user to select an encryption option and may encrypt a document based on a password entered by the user. For example, an encryption key may be generated based on the user password for encrypting the document. In other examples, user data in a form of a "password image" may be used to generate the encryption key. The document is scanned, encrypted with the key, and printed in an encrypted form. The encrypted document can be subsequently scanned, decrypted and printed out as a human-readable copy, which may include plain text, when needed. For example, a user may enter the same password to print a decrypted copy of the scanned encrypted document. The present disclosure can minimize security issues associated with storing a document on a digital medium or storing the document as an unencrypted hard copy. Furthermore, the system encrypts the plain text pixel data before the data is within reach of any software and thus safe. Even if the printer firmware or software is compromised by a virus (which is unlikely, given that the printer does not run external code), a scan image representing a document is already encrypted before the printer firmware or software can touch it. According to the examples of present disclosure, a plain text may be encrypted entirely in the printer without ever being exposed to any hackable environment.

The system may include a scanning subsystem including a scanner. In an example, the scanner may scan a print medium line-by-line to generate consecutive lines of analog scan data. The scanner may have a scan bar that supports a line of light-emitting diodes (LEDs) and a line of sensors along its length. While scanning, the scan bar travels the length of the print medium, which may be a document, from top to bottom. While traveling, the LEDs on the scan bar illuminate a line of the print medium located under the scan bar. Different wavelengths of light are reflected back from the print medium into the line of sensors, such as optical receivers, depending on the color and pattern of the content on the print medium. The scan bar optical sensors generate analog data readings that are sent to an integrated circuit (IC), such as an Application-Specific Integrated Circuit (ASIC), Field Programmable Gate Array (FPGA) or other circuit. The analog data may be sent via a cable of low voltage lines or through another type of transmission line to an analog IC. The analog IC then takes the analog data readings and converts them into digital data using one or several analog-to-digital (AD) converters. In an example, the digitization may be implemented by a hardware pixelization circuit. The pixelization circuit may transform the analog image data into a sequence of discrete boxes of uniform color referred to as pixels.

Encryption is the process of encoding data, for example, into a non-human readable form. For example, plain text is encrypted using an encryption function to generate a cipher text, which may be decrypted with a decryption function back to the original plain text. The encrypted content may include content other than plain text, such as images. The encryption may use a pseudo-random encryption key. A symmetric (or private key) encryption scheme uses the same key for encryption and decryption of data. In one example, a pseudo-randomizing function that transforms a user password string into a cryptographic (encryption/decryption) key of suitable length may be used. For example, a Password-Based Key Derivation Function 2 (PBKDF2) can be used. A string password or a "password image" scan data may be used to generate a unique encryption key. The "password image" is an image produced by scanning of a hard copy image or of a hand drawing provided by a user. In one example, a hash function may be used to produce a hash value in a form of a string of digits from the "password image." This hash value is referred to as a digest. The digest may be converted into an encryption key in the same manner as the password string. In another example, an asymmetric public/private key may be used for the encryption.

In an example, an encryptor may encrypt a sequence of pixels to generate a sequence of encrypted pixels. The encryptor can be implemented in hardware, such as an IC block or an FPGA block or may be implemented as a software module executed by a processor. Prior to printing, the encrypted pixels may be temporarily stored on a non-persistent storage such as Dynamic Random Access Memory (DRAM) buffer. In an example of the present disclosure, prior to the encrypted pixels being stored in the non-persistent storage, the analog sensor data or the unencrypted digital data is not stored or buffered in non-persistent storage. The unencrypted data of the scanned document may not be exposed to firmware or other potential security risks, and thus minimizes susceptibility to unauthorized access of non-encrypted data. For example, the unencrypted sequence of pixels representing a scan line of the print medium goes directly to the encryptor bypassing the DRAM buffer or any other storage that may be available on the printer. While the unencrypted pixels of the scan line may be exposed to printer components for fractions of a second, the entire scan image or a meaningful portion of the scan image may not be intercepted and reassembled in an unencrypted form.

The system may include a printing subsystem that can print the encrypted data as a hardcopy. In one example, the encrypted pixels are printed out as a sequence of swaths. A swath may be a horizontal rectangle the size of a print head. The print head moves and prints a swath, then moves again and prints the next swath and so on for as long as the sequence of pixels to be printed is received in a print pipeline.

The present disclosure uses a term "coupled" to mean electrical coupling to allow exchange or transmission of electrical signals between circuits.

Figure 1:
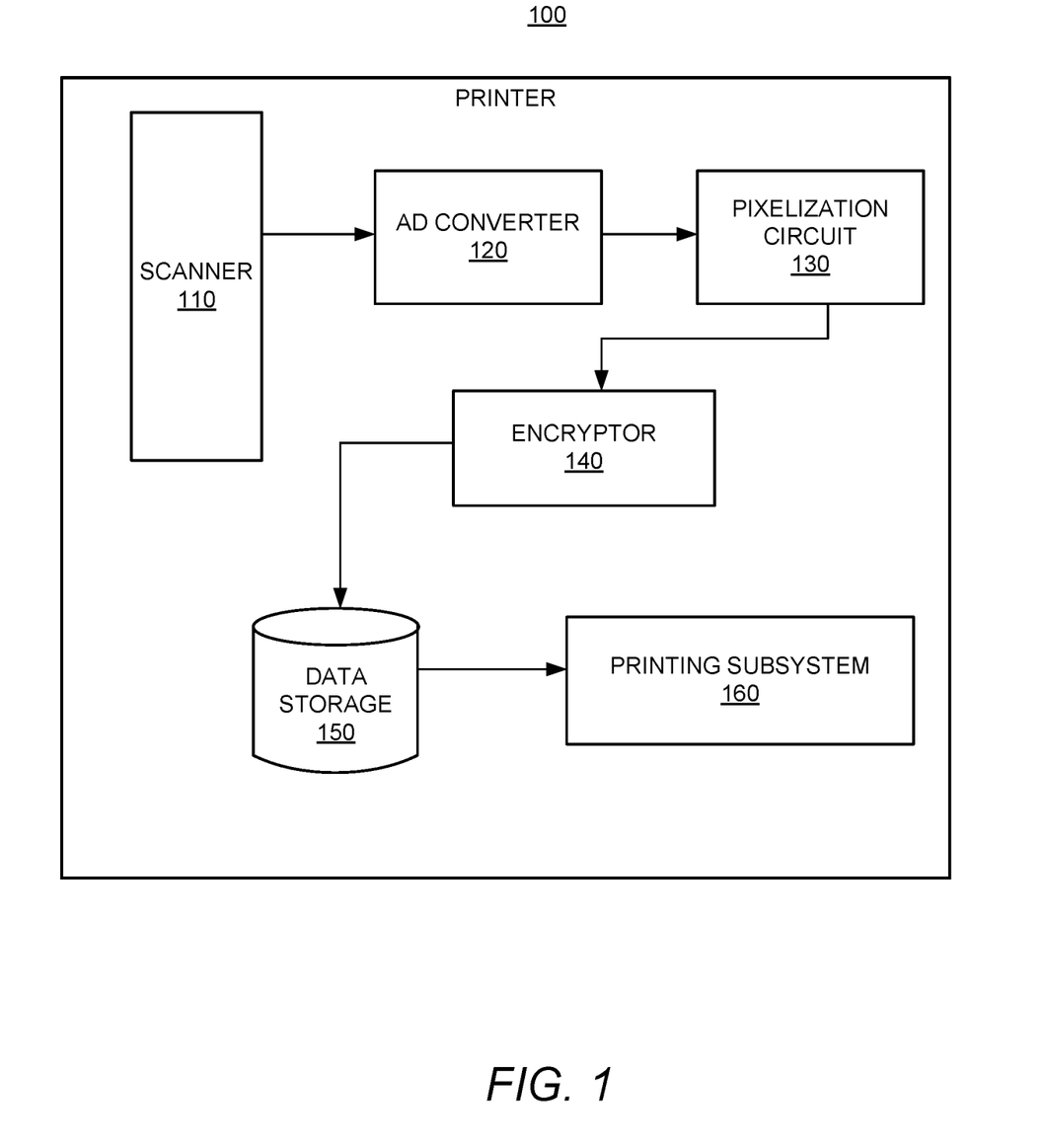
FIG. 1 shows a block diagram of an example of a printing apparatus.

With reference first to FIG. 1, there is shown a block diagram of an example of a printing apparatus 100, for example a multi-purpose printer, that may encrypt and print encrypted documents. It should be understood that the printer 100 depicted in FIG. 1 may include additional components and that some of the components described herein may be removed and/or modified without departing from a scope of the printer 100 disclosed herein.

The printer 100 includes scanner 110 that may be coupled to analog-to-digital converter(s) 120. The scanner 110 has a scan bar that supports a line of LEDs and a line of optical sensors along its length. While scanning, the scan bar travels the length of a document from top to bottom. The scan bar sensors read the scan data and converts the data into analog readings that are sent into the analog-to-digital converter(s) 120. The analog-to-digital converter(s) 120 then takes the analog readings and converts them into scan digital data. In one example, the digital data may be processed by one or several hardware pixelization circuit(s) 130. The pixelization circuit 130 may generate a sequence of pixels representing the scan image data.

The pixelization circuit 130 provides the sequence of pixels to an encryptor 140. The encryptor 140 encrypts the pixels of the sequence, for example, using an encryption key, thereby producing a sequence of the encrypted pixels. Prior to being processed through a printing subsystem 160, the sequence of the encrypted pixels may be temporarily stored or buffered onto a non-persistent data storage 150 such as a DRAM buffer. The sequence of the encrypted pixels may be buffered prior to printing, because the printing subsystem 160 is to accumulate a sufficient amount of pixels for printing a complete swath. Note that the encryptor 140 may also decrypt the sequence of pixels using the same encryption key or an asymmetric key if the scan data is encrypted.

In other words, if the printer 100 receives an encrypted document, the document is decrypted and printed out as a plain text document. Note that multiple encryptors 140 may be used to speed the encryption process.

As discussed above, a user password string may be used to generate an encryption key by using a pseudo-randomizing function (for example, PBKDF2) that transforms a user password string into an encryption key. In one example, the printer 100 may receive a hardcopy "password image" from the user in a form of a picture or user's own drawing on a piece of paper. The printer may scan the "password image" and hash the corresponding pixel data using SHA256 or one of any other cryptographic hash functions that produce a digest (a short hash value). A hashing block may be implemented as a part of the encryptor 140 or as a separate block. The printer may temporarily hold the digest in the DRAM buffer. Once the printer 100 scans a document to be printed in an encrypted form, the encryptor 140 encrypts the sequence of pixel data using an encryption key generated from the digest. Then, the encrypted image is printed using the process described below.

Figure 2:
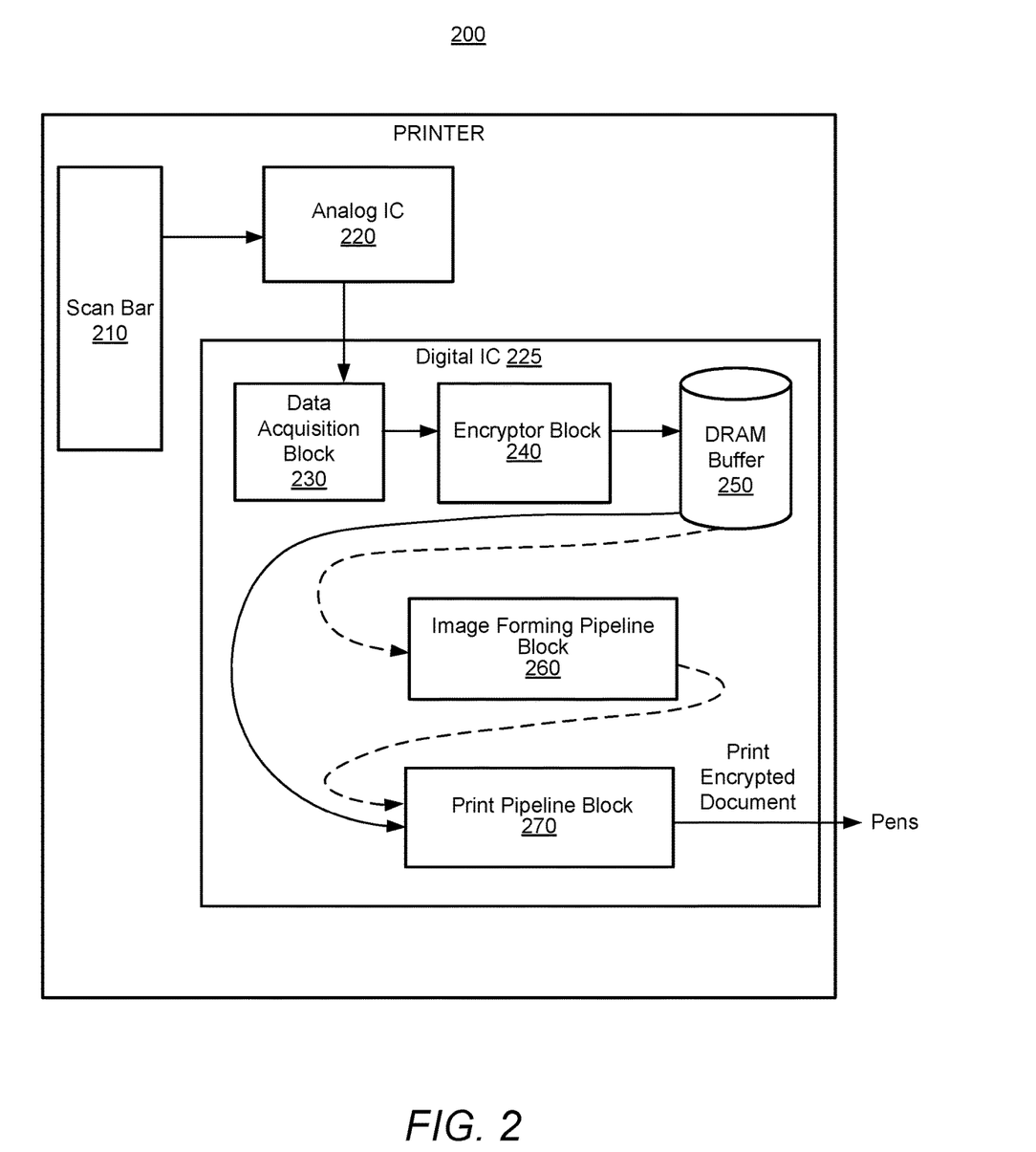
FIG. 2 shows a flow diagram of an example of encryption and printing of an encrypted document.

With reference to FIG. 2, there is shown a flow diagram 200 of an example of encrypting and printing of an encrypted document. A scan bar 210 supports a line of LEDs and a line of optical sensors along its length. The scan bar 210 travels the length of a document from top to bottom. The LEDs of the scan bar 210 illuminate a line of the print medium under the bar. Different wavelengths of light are reflected back off of the document into the optical sensors, depending on the color and pattern of the print medium. The scan bar optical sensors 210 generate analog data readings that are sent to an integrated circuit (IC), such as an Application-Specific Integrated Circuit (ASIC), Field Programmable Gate Array (FPGA) or other circuit. The analog data may be sent via a cable of low voltage lines or through another type of transmission line to an analog IC 220. The analog IC 220 then takes the analog data readings and converts them into digital data using one or several analog-to-digital (AD) converters. The analog IC 220 takes snapshots of the analog readings with an analog-to-digital converter (or several converters) and transfers the digitized readings to digital IC 225. The digitized readings may be represented by a sequence of pixels. Once the sequence of pixels reaches the digital IC 225, the sequence of pixels is immediately processed by a data acquisition block 230.

The data acquisition block 230 filters out noise from the incoming pixel data, re-synchs the clock signal, stitches the separate RGB signals together into RGB encoded pixels, and compresses the color encodings to 1 byte per color. In one example, the data acquisition blocks may compress color encodings to 2 bytes per color. Thus, 1 or 2 bytes may be used per Red, per Green and per Blue so the color of a single pixel is represented with a 3 bytes (or 6 bytes) total. Then, the incoming sequence of pixels is encrypted on the fly by an encryptor block 240. The encryptor block 240 encodes the sequence of pixels into a printable format and adds error correction and detection codes to ensure successful decryption. Note that the sequence of pixels is not exposed to any machine readable instructions prior to being encrypted. A swath of encrypted pixels is buffered into DRAM buffer 250. In this example, the sequence of encrypted pixels skips over image forming pipeline block 260, because no image is formed at this point (the image forming pipeline block 260 is used when the sequence of pixels is decrypted and printed as a plain text image of a document). In the flow diagram depicted in FIG. 2, the encrypted sequence of pixels is to be printed as a plurality of dots instead of an image. The encrypted sequence of pixels is processed through print pipeline block 270, which prints out the encrypted document using ink ejecting pens.

Figure 3:
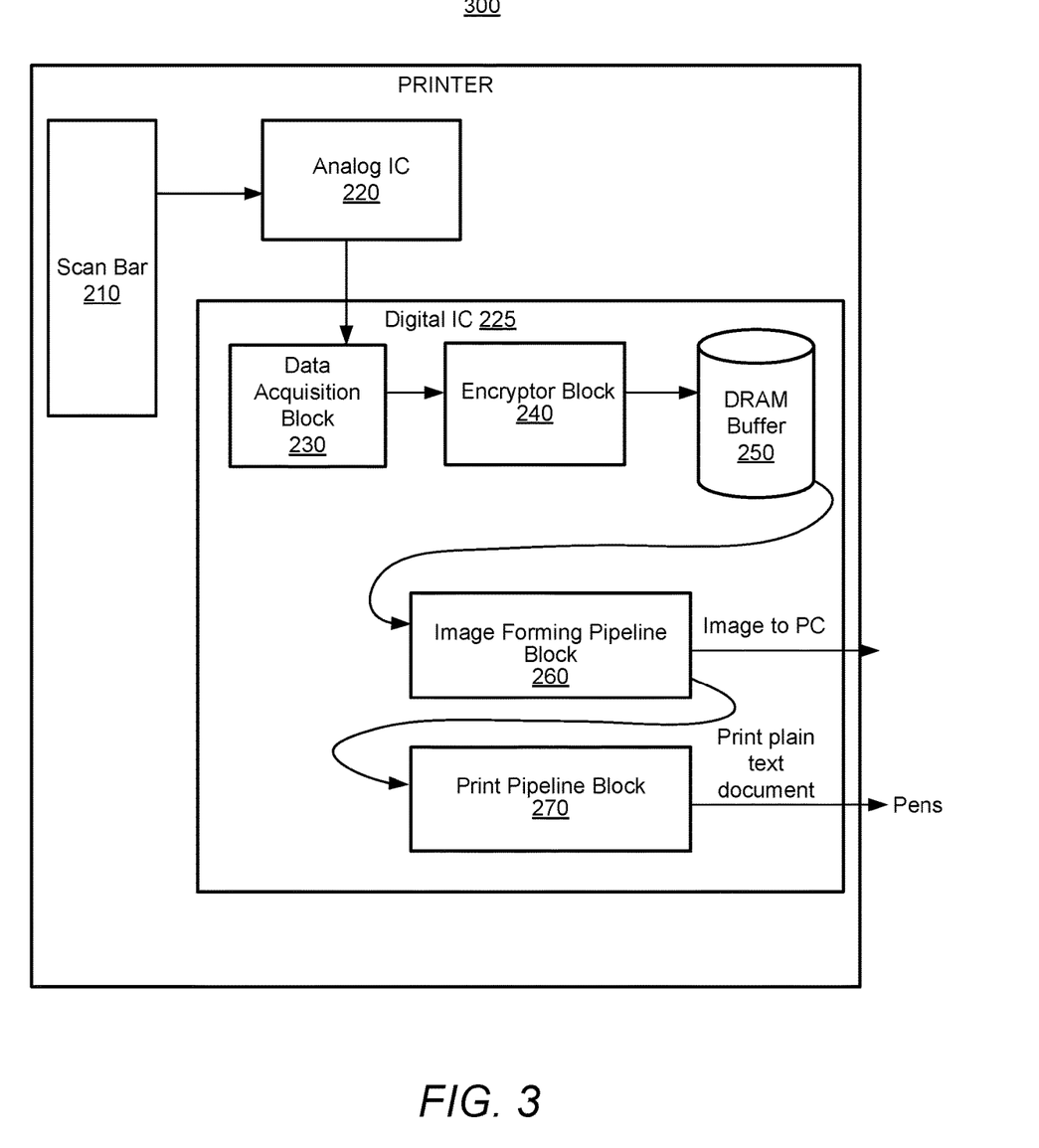
FIG. 3 shows a flow diagram of an example of decryption and printing of a plain text document.

With reference to FIG. 3, there is shown a flow diagram 300 of an example of decrypting and printing of a plain text document. In this example, the scanner scans an encrypted document. As discussed above with reference to FIG. 2, the scan bar 210 supports a line of LEDs and a line of sensors along its length. The scan bar 210 travels the length of a document from top to bottom. The LEDs of the scan bar 210 illuminate a line of the document under the bar. Different wavelengths of light are reflected back off of the document into the sensors, depending on the color and pattern of the printed medium. The sensors may read the reflected light data and convert the data into analog readings that are sent to analog IC 220. The analog IC 220 may take snapshots of the analog readings with an analog-to-digital converter (or several converters) and may transfer the digitized readings to digital IC 225. The digitized readings may be represented by a sequence of pixels. For example, the analog-to-digital converters convert analog optical sensor readings to digital pixels. Once the sequence of pixels reaches the digital IC 225, it is immediately processed by the data acquisition block 230.

The data acquisition block 230 filters out noise from the incoming pixels, re-synchs the clock signal, stitches the separate RGB signals together into RGB encoded pixels, and compresses the color encodings to 1 byte per color. Then, the sequence of pixels is decrypted on the fly by the encryptor block 240. First, the encryptor block 240 scans the incoming sequence of pixels and executes the error detection and correction code. Then, the encryptor block 240 decodes the pixels and decrypts each pixel from the incoming sequence using an encryption key generated from user data such as a password.

In one example, a symmetric encryption scheme may be used. Therefore, the same encryption key may be used for encryption and decryption of the pixel data. The IC 225 buffers a swath of the decrypted pixels into DRAM buffer 250. In this example, the sequence of the decrypted pixels may be processed through the image forming pipeline block 260, because a plain text image is formed at this point. The image forming pipeline block 260 may process the buffered sequence of pixels by cleaning it up and converting the sequence of pixels into a printable format. The image forming pipeline block 260 may include a series of dedicated IC sub-blocks (complex integrated circuits), each designed for a very specific purpose, such as, for example, deskewing (straightening a tilted image).

After the scanned image has been cleaned up, it may be sent off to a user PC or to a flash drive to be used as a digital plain text image. The scanned image may be processed through the print pipeline block 270. The print pipeline block 270 may include a set of IC sub-blocks designed specifically to prepare the scanned image for printing. For example, the print pipeline block 270 performs translation from the RGB color space to the CMYK (cyan, magenta, yellow and black) color space, image scaling, half-toning, and so on. After the processing, the original encrypted document is printed as a plain text document. In one example, encryption and decryption may be executed in a printer, without involvement of dedicated IC blocks. In this case, once a swath of pixel data is buffered into the DRAM, a printer system may raise an interrupt and the machine readable instructions may be executed to encrypt the pixel data and move it directly to the print pipeline.

Figure 4:
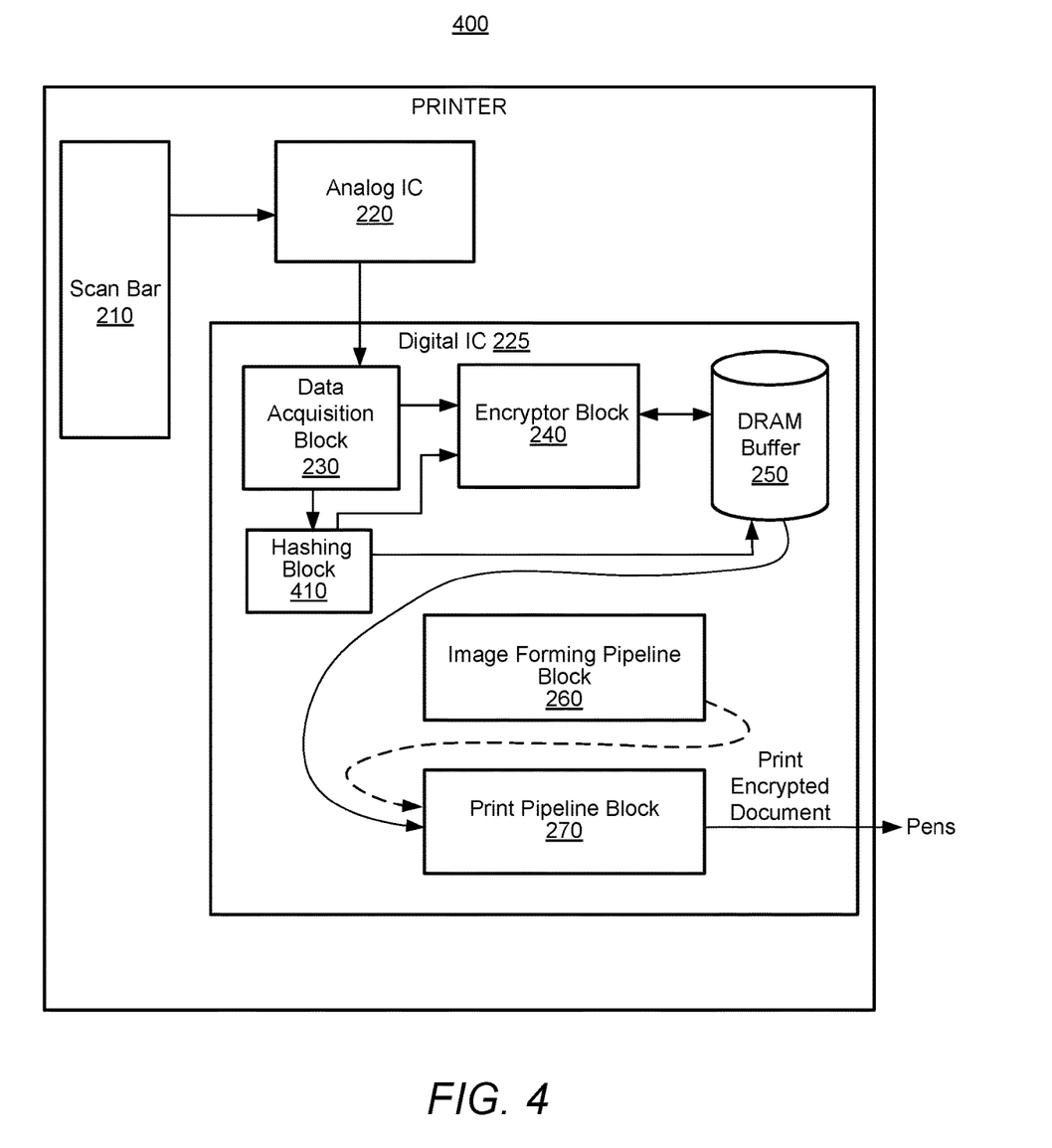
FIG. 4 shows a flow diagram of an example of encryption and printing of an encrypted document using an encryption key generated from a user data.

With reference to FIG. 4, there is shown a flow diagram 400 of an example of encrypting and printing of an encrypted document using an encryption key generated from a user data. In one example, the printer 100 may provide an interface to a user to select an encrypted printing option and to enter a user data in a form of either a password or a "password image" scan data. If a password string is entered, the printer 100 may provide this string to the encryptor to be converted into an encryption key. If the "password image" option is selected, the printer 100 may receive a hardcopy "password image" from a user in a form of a picture or user's own drawing on a piece of paper. The "password image" is scanned as described above with reference to FIGS. 2 and 3. A sequence of pixels representing the "password image" scan data is processed by the data acquisition block 230, which then provides the sequence of pixels to a hashing block 410.

The hashing block 410 may receive and hash the incoming pixel data using SHA256 or one of any other cryptographic hash functions that produce a digest. In one example, the hashing block 410 may be implemented as a separate block coupled to the encryptor block 240. The IC 225 may temporarily hold the digest produced by the hashing block 410 in the DRAM buffer 250 to be retrieved by the encryptor block 240 when needed. In one example, the hashing block 410 may provide the digest directly to the encryptor block 240. The digest may be provided to the encryptor block 240 to be converted into an encryption key uniquely associated with the user. In one example, the digest may be held in the DRAM buffer 250 until retrieved by the encryptor block 240.

The encryptor block 240 encodes the sequence of pixels into a printable format and adds error correction and detection codes to ensure successful decryption. A swath of encrypted pixels is buffered into DRAM buffer 250. The encrypted encoded sequence of pixels is processed by the print pipeline block 270, which prints out the encrypted document.

Figure 5:
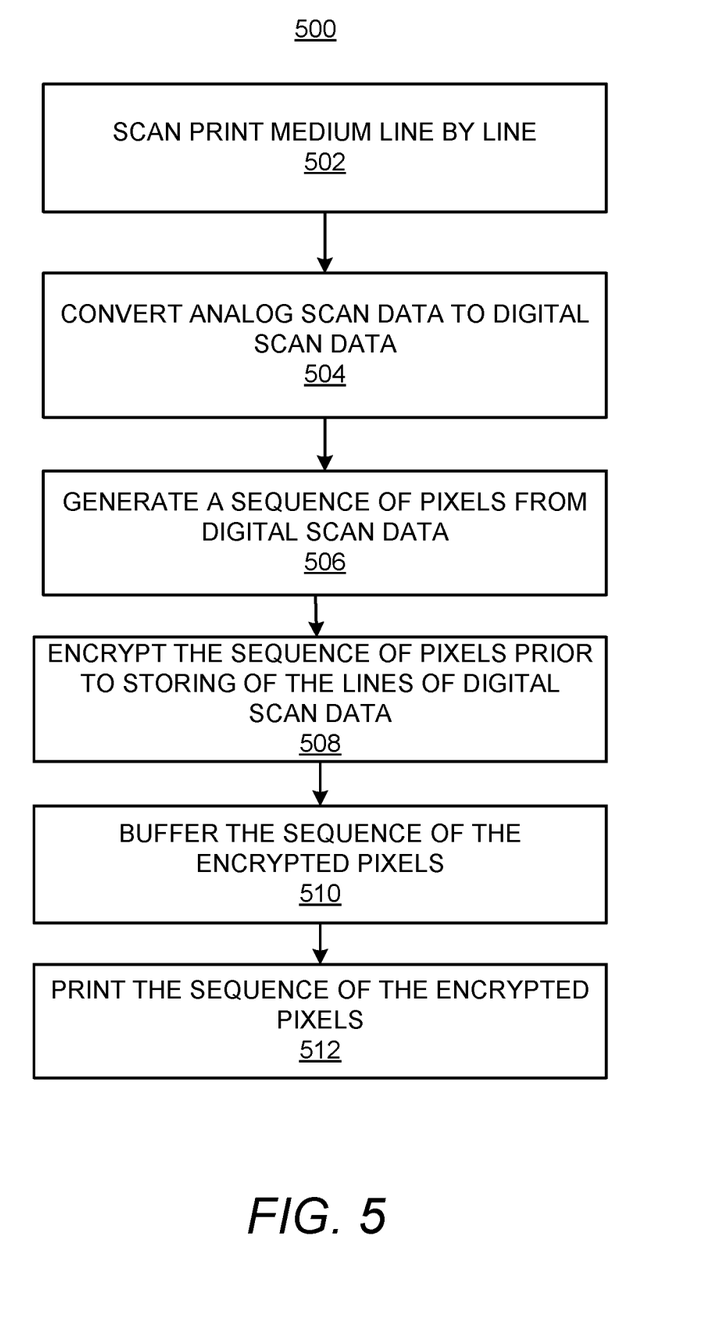
FIGS. 5-6 show diagrams of example methods.

Turning to FIG. 5, there is shown a flow diagram of example method 500 for printing of encrypted document. The method 500 may be performed by the printing apparatus described in FIG. 1 or 2. At block 502, the scanner scans a print medium line-by-line. At block 504, the analog-to-digital converter converts an analog scan data to digital scan data. At block 506, the pixelization circuit generates a sequence of pixels from each line of the digital scan data. At block 508, an encryptor encrypts the sequence of pixels prior to storing of the lines of the digital data. At block 510, the IC 225 buffers the sequence of encrypted pixels onto a DRAM buffer. At block 512, the printing subsystem prints the sequence of the encrypted pixels.

Figure 6:
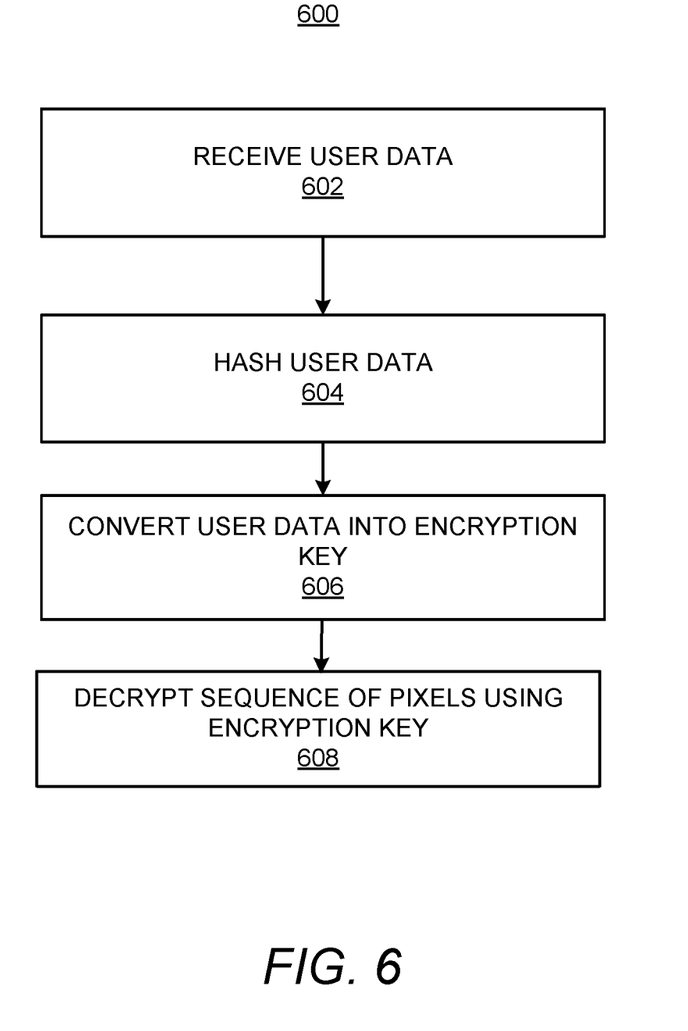

In FIG. 6, there is shown a flow diagram of example method 600 for printing of encrypted (or decrypted) document. At block 602, the printing apparatus receives user data. At block 604, the hashing block hashes the user data to produce a digest. At block 606, the encryptor converts the hashed user data into an encryption key. At block 608, the encryptor decrypts a sequence of pixels using the encryption key.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations.

The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A printing apparatus comprising:
a scanner to scan a print medium to generate analog scan data;
an analog-to-digital converter coupled to the scanner to receive the analog scan data and convert the analog scan data to digital scan data;
a hardware pixelization circuit to generate a sequence of pixels from the digital scan data;
an encryptor to encrypt the sequence of pixels to generate a sequence of encrypted pixels, wherein the encryptor is to encode an error detection and correction code into the sequence of the encrypted pixels;
a data storage device to store the sequence of the encrypted pixels; and
a printing subsystem to print the stored sequence of the encrypted pixels.

2. The printing apparatus according to claim 1, further comprising a hashing block coupled to the encryptor to generate a digest from a password image scan data.

3. The printing apparatus according to claim 2, wherein the encryptor is to convert the digest into an encryption key.

4. The printing apparatus according to claim 1, wherein the data storage device is a dynamic random-access memory (DRAM) buffer.

5. The printing apparatus according to claim 4, wherein the DRAM buffer is to hold the sequence of the encrypted pixels.

6. The apparatus according to claim 1, wherein the printing subsystem is to print at least one swath comprising the encrypted pixels.

7. The printing apparatus according to claim 1, wherein the encryptor is to decrypt the sequence of the encrypted pixels to generate a sequence of decrypted pixels using an encryption key generated from a string or an image.

8. The printing apparatus according to claim 7, further comprising an image forming device, wherein the image forming device is to convert the sequence of the decrypted pixels into a printable format.

9. The printing apparatus according to claim 7, wherein the encryptor is to apply the error detection and correction code to the sequence of the encrypted pixels prior to decryption.

10. A method comprising:
scanning, by a scanner, a print medium line-by-line to generate analog scan data;
converting, by an analog to digital converter, the analog scan data to digital scan data;
generating, by a pixelization circuit, a sequence of pixels from the digital scan data;
encrypting, by an encryptor, the sequence of pixels into a sequence of encrypted pixels;
encoding, by the encryptor, an error detection and correction code into the sequence of the encrypted pixels;
buffering the sequence of the encrypted pixels into a data buffer to accumulate a swath of the encrypted pixels; and
printing the swath of the encrypted pixels from the data buffer.

11. The method according to claim 10, further comprising:
receiving a user data;
hashing the user data; and
converting the user data into an encryption key using a pseudo-randomizing function, wherein the encryption key is used to encrypt the sequence of pixels or to decrypt the sequence of encrypted pixels.

12. The method according to claim 11, further comprising decrypting the sequence of encrypted pixels to generate a sequence of decrypted pixels using the encryption key.

13. A printing apparatus comprising:
a scanner to scan a print medium to generate analog scan data;
an analog-to-digital converter coupled to the scanner to receive the analog scan data and convert the analog scan data to digital scan data;
an encryption circuit coupled to the analog-to-digital converter to encrypt the digital scan data into encrypted digital scan data and encode an error detection and correction code into the encrypted digital scan data;
a data buffer to temporarily store the encrypted digital scan data; and
a printing subsystem coupled to the data buffer to print the stored encrypted digital scan data.

14. The printing apparatus according to claim 13, further comprising:
a hash circuit to:
receive a user data;
hash the user data; and
convert the user data into an encryption key,
wherein the encryption circuit is to use the encryption key to decrypt the encrypted digital scan data in response to receiving the encrypted digital scan data.

* * * * *